United States Patent [19]
Wieland et al.

[11] Patent Number: 5,237,019
[45] Date of Patent: Aug. 17, 1993

[54] METAL-CONTAINING, SHAPED POLYMERIC, TERTIARY AND/OR SECONDARY ORGANOSILOXANE AMINE COMPOUNDS, METHOD OF THEIR PRODUCTION AND USE

[75] Inventors: Stefan Wieland, Offenbach am Main; Peter Panster, Rodenbach; Bertrand Despeyroux, Hanau; Klaus Deller, Hainburg, all of Fed. Rep. of Germany

[73] Assignee: Degussa Aktiengesellschaft, Frankfurt am Main, Fed. Rep. of Germany

[21] Appl. No.: 858,415

[22] Filed: Mar. 27, 1992

[30] Foreign Application Priority Data

Apr. 3, 1991 [DE] Fed. Rep. of Germany ....... 4110706

[51] Int. Cl.$^5$ .......................................... C08F 283/00
[52] U.S. Cl. .................... 525/475; 502/109; 502/158
[58] Field of Search ................. 525/475; 502/109, 158

[56] References Cited

U.S. PATENT DOCUMENTS

| | | | |
|---|---|---|---|
| 4,424,332 | 1/1984 | Panster et al. | 528/30 |
| 4,647,679 | 3/1987 | Panster et al. | 556/9 |
| 4,845,163 | 7/1989 | Panster | 525/475 |
| 4,954,599 | 9/1990 | Panster et al. | 528/38 |
| 5,003,024 | 3/1991 | Panster et al. | |
| 5,093,451 | 3/1992 | Panster et al. | 528/9 |

FOREIGN PATENT DOCUMENTS

WO91/14500 10/1991 PCT Int'l Appl. .

OTHER PUBLICATIONS

Khatib, I. S. and R. V. Parish, "Insoluble Ligands and Their Application", *Journal of Organometallic Chemistry*, (1989), vol. 369, pp. 9-16.
Chemical Abstract No. 274039/44 to Plurichemie et al., (1985).

*Primary Examiner*—Melvyn I. Marquis
*Attorney, Agent, or Firm*—Beveridge, DeGrandi, Weilacher & Young

[57] ABSTRACT

Metal-containing, shaped, polymeric, tertiary and/or secondary organosiloxane amine compounds are introduced which contain the metals Pd, Pt, Ru, Rh individually or in combination as well as optional promotors and/or moderators. The organosiloxane amine functioning as carrier for the metals contains the units

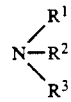

and/or units

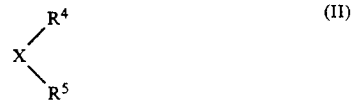

in which $R^1$ to $R^5$ are a group

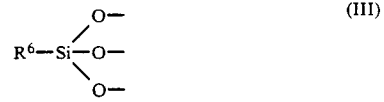

with $R^6$ as a double-bonded group bound to N and Si (e.g. an alkylene group) and X is an amine group such as

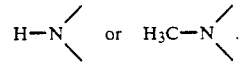

The carrier substance can be cross-linked with cross-linking agents containing Si, Ti, Zr or Al. The metal-containing product is spherical in form and is defined by the parameters of sphere diameter, specific surface and pore volume as well as bulk density. A method of production is disclosed which can be carried out in several variants as well as the use of the metal-containing product as catalyst for hydrogenation reactions and oxidation reactions.

17 Claims, No Drawings

METAL-CONTAINING, SHAPED POLYMERIC, TERTIARY AND/OR SECONDARY ORGANOSILOXANE AMINE COMPOUNDS, METHOD OF THEIR PRODUCTION AND USE

BACKGROUND OF THE INVENTION

The present invention relates to organosiloxane amine compounds containing palladium, platinum, ruthenium and/or rhodium in which compounds one or several of the noble metals are present in a fixed manner on certain spherically shaped organopolysiloxane amines.

DE patent 38 00 563 describes shaped, polymeric, tertiary and secondary organopolysiloxane amine compounds and DE-OS 34 04 702 describes platinum- and/or palladium-containing organosiloxane ammonium compounds, their production and use.

The amine compounds used in the present invention are of the type with a selected and narrow particle size distribution disclosed in DE patent 38 00 563 and DE paten 39 25 359 as regards their composition and their production. Optionally, these amine compounds can be activated by a reductive treatment. These polymeric compounds containing noble metal, which are insoluble in water and in organic solvents, can be used as catalysts for numerous reactions such as hydrogenations, oxidations and hydrosilylation and are distinguished by a high activity and selectivity.

Carrier catalysts containing noble metal are used in industry for numerous chemical reactions. They are used in the form of pellets, tablets, shaped bodies, extruded blanks and extrudates of various geometric forms and sizes for use in a fixed bed or in a moving bed as well as in the form of fine powders for suspensions in agitated reactors.

The carrier materials used for these purposes are either activated carbons of various genesis, hardness and purity which were subjected to several physico-chemical purification and activation steps or are oxidic carriers such as $Al_2O_3$, $SiO_2$, $TiO_2$ and $ZrO_2$, which are produced either via sol-gel methods, precipitation reactions or via flame hydrolysis (here as pyrogenic oxide powder) and are optionally transformed subsequently. The noble-metal component is applied onto the carrier in these catalysts by means of impregnation, wetting or spraying of the carrier materials with solvents containing noble metal or by adsorption or by precipitating and depositing noble-metal compounds onto the carrier, after which a reduction is carried out if necessary. The metal clusters and metal surfaces produced thereby are by nature only insufficiently defined and conditionally reproducible. Another disadvantage is the ready detachability of the metals in complexing or aggressive media. Also, the deficient wear resistance, especially of irregularly formed carrier materials, is a problem. The deficiencies result in a wearing off of the noble metal in actual use. This in turn leads to a loss of noble metal and in contamination of the product to be produced with the catalyst.

The invention has the problem of synthesizing novel organopolysiloxanes containing noble metal which organopolysiloxanes can be used as catalysts and which do not exhibit the above disadvantages.

SUMMARY OF THE INVENTION

A feature of the present invention is to provide metal-containing organopolysiloxane amine compounds which are shaped, polymeric, tertiary and/or secondary organosiloxane amine compounds containing palladium, platinum, ruthenium and/or rhodium as well as optionally promotors and/or moderators, and which consist essentially of units of the formula:

and/or of units of the formula:

in which

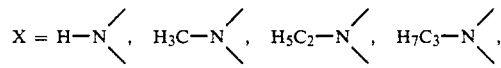

$R^1$ to $R^5$, which can be identical or different, represent a group of the formula:

in which $R^6$ is bound directly to the nitrogen atom and represents a linear or branched alkylene group with 1 to 10 C atoms, a cycloalkylene group with 5 to 8 atoms or a unit of the formula:

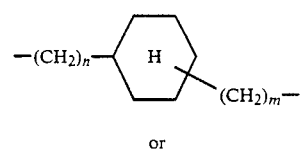

or

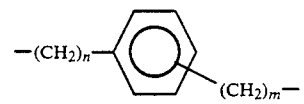

which n and m are each an integer from 0 to 6, n is the number of methylene groups attached to the N position and m is the number of methylene groups attached to the Si position, the free valences of the oxygen atoms bound to the Si atoms are saturated as in silica skeletons by silicon atoms of further groups of formula III and/or via the metal atoms in one or several cross-linking binding links of the formula:

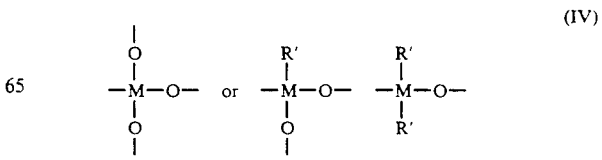

-continued and

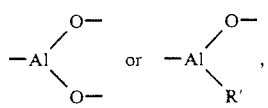

M is an Si, Ti or Zr atom and R' is a linear or branched alkyl group with 1 to 5 C atoms or is a phenyl group, the ratio of the silicon atom from the groups of formula III to the metal atoms in the cross-linking binding links (IV) is 1:0 to 1:30 and the ratio between the number of moles of amine units (I) and amine units (II) is 1:0 to 0:1.

The polymeric organosiloxane amine compounds are in the form of macroscopic spherical particles with a diameter of 0.01 to 3.0 mm, a specific surface of 0.01 to 1200 m$^2$/g, a specific pore volume of 0.01 to 6.5 ml/g and a bulk density of 50 to 1000 g/l.

Another feature of the invention resides in the method of producing the metal-containing, shaped, polymeric organosiloxane amine compounds having the formula described above, wherein one or more hydrous or anhydrous metal compounds (VI) of the formula:

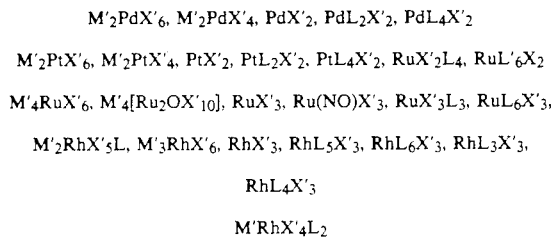

in which
X' represents Cl, Br, I, CN, NO$_2$, NO$_3$, ½ SO$_4$, acetate, acetyl acetonate, or OH;
L represents NH$_3$, a primary, secondary or tertiary amine or diamine as well as CO or H$_2$O and M' represents H, Na, I, NH$_4$, or ½ Ba are reacted, in a stoichiometric proportion corresponding to the desired metal concentration in a solvent or solvent mixture which dissolves the metal compound (VI) at least partially, with a spherically formed, polymeric organosiloxane amine initial material consisting essentially of units of formula I and/or II as defined above.

The resulting metal-containing solid is subsequently treated, optionally after a change of the solvent before or after one or more of the measures of separation of the liquid phase, by washing with the same or another solvent or extracting, then drying at room temperature to 250° C. in air, under protective gas or in a vacuum, tempering in air or under protective gas at 150° to 300° C. and classifying. Optionally, a stoichiometric, less than stoichiometric, or excess amount of a reducing agent can be used for 1 minute to 48 hours at room temperature to 200° C. and optionally at a superpressure corresponding to the sum of the partial pressures of the components of the reaction mixture at the particular temperature.

In the process, the organosiloxane is as defined above, i.e., M and R' have the same meaning as above, the ratio of silicon atoms of the groups of formula III to the metal atoms M and Al in the cross-linking binding links (IV) is 1:0 to 1:30 and the ratio between the number of moles of amino units (I) and amine units (II) is 1:0 to 0:1. The spherical particles have a diameter in a range of 0.01 to 3.0 mm, a specific surface of 0.01 to 1200 m$^2$/g, a specific pore volume of 0.01 to 6.5 ml/g and a bulk density of 50 to 1000 g/l.

DETAILED DESCRIPTION OF THE INVENTION

The fact that the shaped, polymeric organopolysiloxane amine compounds containing palladium, platinum, ruthenium and/or rhodium and in accordance with the invention are functionalized carrier catalysts is of special significance. The amine functions attached to tertiary or secondary amine groups and apparent from the above formulas exert considerable influence on the properties of the finished catalysts in the areas of technology and chemistry where they are used. In particular, the dispersion of the metal can be regulated and increased by the present invention in comparison to carrier catalysts with no organically functionalized carriers.

The type of the organic spacer group connecting the amine function to the silicon can be varied within broad limits in the case of the catalytic products presented without basic differences occurring in the catalytic behavior of the individual substances. Additional properties of the organopolysiloxane amine compounds which properties are advantageous in application technology can be adjusted by means of the insertion of additional cross-linking units which are designated according to the customary classification (see W. Noll, "Chemie und Technologie der Silikone") as tetrafunctional (Q type), trifunctional (T type) or difunctional (D type) with the central atoms Si, Ti or Zr or by means of T or D types with Al as central atom. Important characteristics of the catalytic products of the invention are the dimensions of the spherical particles, which determine the form of use of the catalyst, the porosity, the bulk density associated therewith and the surface area, which is decisive for the reactive kinetics of the reactions to be catalyzed. All these properties can be realized in numerous variants within the framework included in the present invention.

It proved to be advantageous for uses such as for hydrogenation catalysis if the selected metal or a selected metal combination is present largely in a zerovalent, that is, elementary form since this distinctly elevates the activity, e.g. the hydrogenating activity in standard test reactions and on the other hand the wearing off of metal by solvents or reagents with a complexing action is avoided. Thus in one aspect of the invention, the palladium, platinum, ruthenium and/or rhodium are present primarily in the elementary form. The particular degree of reduction desired depends on the noble metal used and on the reaction system of the application.

Whereas the pure metallic state is usually desired in the case of a hydrogenation, e.g. in the case of Pt and Rh, at least a partially oxidized catalyst is preferred for applications in oxidation reactions, e.g. in the case of Pd. In the case of a combination of the noble metals claimed, an empirically determined, specific degree of reduction can prove to be necessary or favorable. The expert in the art thus has considerable latitude for optimizations.

The combination of two or more of the metals with each other as well as with further transitional metals, alkaline metals and/or alkaline-earth metals as well as with the metals of the 3d, 4th and 5th main groups, in which instance Li, Na, K, Mg, Ca, Fe, Cu, Ag, Au, Zn, Cd, Sn, pb, Sb and Bi are especially preferred, also offers advantages as regards reactivity and selectivity of the catalysts. When multimetal catalysts are used, a common practice in the art, the metal components added in addition to the palladium, platinum, ruthenium and rhodium act as promoters or moderators.

The combination of several metals proved to be particularly useful; e.g., in the synthesis of vinyl acetate; here, the combinations Pd/Au, Pd/Cd or Pd/Au/Bi/K are described, among others.

Pd/Pt/Bi catalysts are frequently used for oxidation reactions and Pd/Pb systems for the selective hydrogenation of C-C triple bonds to alkenes.

In the case of the claimed organosiloxane amine compounds, basically the same synergistic effects result from the combination of various metals as apply to the above-named combinations.

It can be advantageous, depending on the ultimate use, to vary the noble-metal content of the polymer from 0.001% by weight to 20% by weight, preferably 0.01% by weight to 10% by weight and to use highly active catalysts provided with high noble-metal charges. This is especially appropriate in reactions in which the goal is a complete hydrogenation and the reaction medium optionally contains high amounts of catalytic poisons. On the other hand, highly selective catalysts with very small noble-metal contents are also interesting in which the noble metal is optionally applied in the form of a thin layer only a few $\mu$m thick on an organosiloxane amine with large sphere diameter.

As a result of their good availability, organosiloxane amine polymeric compounds are also especially interesting which are characterized in that $R^1$ to $R^5$ stand for a group of the formula V.

Such silanes with the organofunctional propyl group can be economically obtained in rather large amounts; moreover, the desired binding of an organic functionality is achieved with the $C_3$ spacer grouping without disturbing to any great degree the silica-like matrix.

The organosiloxane amine compounds can be present as statistical copolycondensates with homogeneous, statistical, spacial distribution of the monomers. Block copolycondensates are especially interesting which are obtainable by means of precondensation of the various monomer components with themselves or other reactive substances such as the known monomeric initial materials for the "cross-linking binding links" identified above; e.g., $Si(OCH_3)_4$. Subsequent condensation is carried out of the oligomers or telomers obtained as intermediate products or by means of successive condensation of the monomer components with previously polycondensed material. Of course, mixed copolycondensates are also possible in all variants sufficiently known from organic polymer chemistry.

The technical advantage of such copolycondensates resides in the possibility of purposefully manufacturing products which have areas of high functionality density and metal density and areas of low functionality and low metal content. It is apparent that in this manner shell catalysts with a high amount of functionality on the surface and low functionality in the interior can be produced in an especially advantageous manner.

Thus, depending on the type of copolycondensates, metal-containing, formed organosiloxane amine compounds with a metal enrichment on the surface in the form of a thin or thick layer, on a spherical shell in the interior of the material or with homogeneous metal distribution are possible. Known industrial catalysts attempt to achieve all this by means of a sometimes rather expensive variation of the impregnation technique. The performance of the herein provided, individual, catalytically active substances and of their combinations as well as their use represent the latest state of the art development. The use of purposefully produced, statistical copolycondensates, block copolycondensates and mixed copolycondensates makes possible a direct, reliable and simple control of the distribution of metal in the catalytic synthesis.

The method for producing the metal-containing organosiloxane amine compounds and its variations have special significance as further features of the invention.

For this, a noble-metal compound of Pd, Pt, Ru and/or Rh, optionally together with further compounds containing noble metal or base metal (promotor precursors) is reacted with a polymeric, spherical organosiloxane amine optionally present as copolycondensate according to the method first described above. Depending on the type of the noble-metal compound(s) used, the reaction must take place at appropriate temperatures in order on the one hand to avoid an uncontrolled decomposition and separation of metal and on the other hand to achieve a complete reaction of the metal compound with the organosiloxane amine.

Temperatures below, at or above room temperature (e.g. 5° C.–80° C.) can be used. The ionic strength, the pH, different according to the selection of metals, for completing the reaction and for avoiding premature precipitations (approximately pH 4–10) and the general chemical composition of the reaction solution are of significance. Thus, it proved to be helpful, e.g. in the case of a reaction with Rh(III) compounds, if an alkali halogenide is added in addition to the reaction solution, which is acidic here. The reaction time influences the spatial distribution and the strength of the bond of the metal on the organosiloxane amine compound. It has been found that 1 minute to 48 hours can be used.

The organosiloxane amine used for reaction with the metal compounds can vary according to the above description in its chemical composition. The ratio of secondary to tertiary amines in the copolycondensate, among other things, has considerable significance hereby (in the presence of both amine types, that is, of units of formulas I and II). On the one hand, the polycondensation behavior and, connected thereto, especially also the particle size of the shaped organosiloxane amine can be controlled by the amine ratio. On the other hand, the amine functionality influences to a great extent the stability of the metal complexes temporarily formed during the reaction according to method of the invention.

Since secondary and primary amino silanes also additionally accumulate during the production of the tertiary amino silane used in the condensation, the use of a mixture of these amines offers even additional economic and ecological advantages for the production of the polymeric organosiloxane amine compounds since an expensive purification step is saved. The presence of primary amino silane causes no problems in as far as its concentration is small enough (<10 molar %).

A special advantage is achieved by the use of formed organosiloxane amine compounds present macroscopically in the form of spherical particles as catalytic carrier. Note in this regard especially the superb mechanical properties of the spherical material, associated with high wear resistance and note also the good filterability in comparison to fine, shaped material which is present in a dry state in powder form and, moistened, as a poorly filterable sludge. A comminution and grinding of the shaped, polymeric organosiloxane amine compounds is naturally possible; however, a possible increasing of the catalytic activity in the individual instance is opposed by serious disadvantages in method and use so that this is on the whole not advantageous.

In principle, any solvent in which the metal compound is at least partially soluble can be used for the reaction of the described reactants - noble-metal compound and polymeric organosiloxane amine; however, common solvents of a polar nature whose handling is largely without problems such as alcohols and especially water are preferred. Water, with superb dissolving behavior, also makes it possible to use further salts which can be adsorbed by the carrier and function in the catalyst as promotors or moderators.

The metal-containing organosiloxane amine can even be reductively post-treated according to the method of the present invention, for which all techniques common in catalyst preparation can be used. Of course, individual reducing agents and method variants are more or less suitable for the reaction as a function of the noble metal, noble-metal concentration and desired catalytic action. In addition to the type and strength of the reducing agent, in particular the temperature and the concentration are significant parameters. The drying process and/or tempering process are also important for the activity and selectivity of the catalysts produced. Of course, one or both steps can be eliminated. For use in oxidation reactions and the selection of metals or metal compounds (e.g. $PtO_2$) that are suitable therefore, the optionally used, terminating, reductive treatment of the catalytic initial product can be carried out only incompletely. This can be supplemented by an oxidative treatment with oxygen, oxygen-containing gases or other oxidizing agents at the same temperatures and treatment times or replaced. A corresponding shaping is also possible in the medium of the oxidation reaction.

The workup recovery of the shaped products can take place under protective gas, under normal atmosphere or under protective gas containing defined amounts of reactive gases such as hydrogen or also oxygen. The conditions selected influence among other things the activity, selectivity and optionally the pyrophoric tendency of the catalyst. A superficial passivation can be achieved by means of traces of oxygen, as is known from the literature.

The reductive treatment of the metal-containing organosiloxane amine compounds can be carried out in liquid, alcohol-containing phase and heated or dried in an alcohol-moist state and/or tempered. Also, it can be carried out by means of reaction with gases or vapors of alcohols or other organic compounds such as aldehydes.

The reduction of the metal-containing, shaped, polymeric organosiloxane amine may be carried out with a linear or branched alcohol having one to five carbon atoms, with formaldehyde, an alkali formate, an alkaline-earth formate, hydrazine, a hydrazine compound, alkali- or alkaline-earth metal boron hydride, hydrogen or carbon monoxide with a borane compound, an alkali- or alkaline-earth metal alanate, alane or an alane compound, or an alkali- or alkaline-earth metal hydride.

A reductive treatment can take place immediately after the fixing of the noble metal on the formed organosiloxane amine or at a later time, especially also during later use as catalyst under the reaction conditions of specific use of the catalyst. The same applies to any oxidative treatment.

The metal-containing organosiloxane amine compounds of the invention are used with advantage for the catalysis of reductions and oxidations in general, especially of reactions with hydrogen or oxygen. Likewise, reactions can also be carried out therewith for which industrial metal catalysts are used in general—note in particular hydrosilylation.

The catalysts of the invention can be used as suspension contacts or also in a fixed or fluid bed.

The invention is explained further in the following using examples of embodiments and taking into consideration the basically important method steps by way of example.

EXAMPLES

Example 1

20 g of a polymeric organosiloxane amine of the formula unit $N(CH_2—CH_2—CH_2—SiO_{3/2})_3 \cdot 3 \; SiO_2$ produced according to example 3 of DE patent 38 00 563 (incorporated herein by reference) with spherical particles in a particle size of 95% between 50 and 100 μm were suspended in 150 ml distilled water and agitated 2 hours with a KPG agitator at room temperature. 3.279 g $K_2PdCl_4$ dissolved in 50 ml water were added to this suspension drop-wise in the course of 10 minutes and the reaction solution agitated a further hour for adsorption. The product was filtered off, washed with water and then several times with ethanol, agitated 30 minutes at 60° C. in ethanol, filtered off and then dried at 145° C. in a current of nitrogen.

| | |
|---|---|
| Bulk density: | 320 g/l |
| Mesopore volume: | 1.76 ml/g ($d_{max}$ = 15 nm) |
| Macropore volume: | 0.56 ml/g |
| ESCA results: | approximately 65% "PdO" (336 eV), approximately 35% "PdO_2" (338 eV) |
| Pd crystallite size from TEM photographs: | 7-9 nm |

Example 2

40 g of a polymeric organosiloxane amine of the formula unit $N(CH_2—CH_2—CH_2—SiO_{3/2})_3 \cdot 2 \; SiO_2$ produced according to DE patent 38 00 563 with spherical particles in a particle size of 95% between 0.3 and 0.6 mm were suspended in 300 ml distilled water and agitated ½ hour with a KPG agitator at room temperature. 626.2 mg $K_2PdCl_2$ dissolved in 50 ml water were added to this suspension and agitated ½ hour.

A pH=9 was adjusted with 18% by weight soda solution and 6.5 g sodium formate added. The solution was then heated and agitated 1 hour at 60° C. The product was filtered off, washed and dried at 150° C.

Example 3

5 g of an organopolysiloxane of the formula $N(CH_2—CH_2—CH_2—SiO_{3/2})_3 \cdot 2 \; SiO_2$ with particle size 0.2-0.3 mm were suspended in 50 ml water, 736.1 mg $RuCl_3 \cdot H_2O$ dissolved in 20 ml water added and the mixture agitated 70 minutes at room temperature. The pH was adjusted to pH 6 and adsorbed 1 hour at 60° C. with the pH being maintained constant. The raw product was removed by suction, charged into 23 ml water and compounded with 27 ml 24% hydrazinium hydroxide solution, the solution carefully heated up to 60° C. (development of gas) and allowed to react 1 hour. The catalyst was then removed by suction, washed with ethanol and dried under $N_2$ inert gas at 150° C. The catalyst is pyrophoric and anneals in air; the further handling must take place under inert gas.

Example 4

5 g of a polysiloxane of the formula $N(CH_2-CH_2-CH_2-SiO_{3/2})_3 \cdot 2\ SiO_2 \cdot 0.2\ TiO_2$ (particle size range 0.1-1.0 mm) were charged into a solution of 562 mg $K_2PtCl_4$ in 50 ml water and agitated 2 hours at 60° C. After the solution had cooled off, 5.1 ml of a 37% by weight solution of formalin were added and the pH adjusted to 9.3. After a reaction time of 1 hour at 60° C., the catalyst was removed by suction. Water content: 54% by weight.

Example 5

10 g of a polysiloxane of the formula $N(CH_2-CH_2-CH_2-SiO_{3/2})_2 \cdot 0.4\ N(CH_2-CH_2-CH_2-SiO_{3/2})_3 \cdot SiO_2$ (particle size range 1.0-1.8 mm) were agitated with 1.64 g $K_2PdCl_4$ dissolved in 80 ml 0.2 M NaCl solution at room temperature. The product was filtered off and the dark brown solid transferred into a heatable glass column with gas connection. It was first washed 30 minutes at room temperature with $H_2$, then the internal temperature slowly raised to 140° C. The hydrogen consumption was approximately 29 ml/min. (measurement at room temperature and 10 mbar $H_2$ superpressure). The reaction was over after 1 hour and the catalyst was cooled off in a current of Ar gas.

CO adsorption: 1.85 ml/g.

Example 6

20 g of a polysiloxane of the formula $N(CH_2-CH_2-CH_2-SiO_{3/2})_3 \cdot 3\ SiO_2$ were suspended in 200 ml ethanol and a solution of 2.67 g $RhCl_3 \cdot 3\ H_2O$ in 200 ml ethanol was added. The batch was agitated under inert gas (Ar) for 3 hours at room temperature and then refluxed for 6 hours. The black solid was removed by suction, washed several times with water, removed by suction and the water content determined. Water content: 67% by weight.

Example 7

10 g. of a polysiloxane prepared according to example 11 of DE patent 39 25 360 were reacted analogously to example 1 with 328 mg $K_2PdCl_4$. A catalyst was obtained with the composition

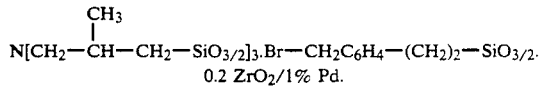

Example 8

5 g of a polysiloxane of the formula $C_2H_5N(CH_2CH_2SiO_{3/2})_2 \cdot (H_3C)_2SiO_{2/2} \cdot 0.2\ AlO_{3/2}$ were reacted according to example 3 with 368 mg $RuCl_3 \cdot H_2O$ (35% by weight Ru) and 5.128 g of a catalyst containing 2.5% by weight Ru were obtained.

Example 9

5 g of a polysiloxane prepared according to example 9 of DE patent 39 25 359 were reacted in accordance with example 1 and 5.10 g of a polymer obtained containing 1.9% by weight Pd and with the composition $H-N[(CH_2)_{10}SiO_{3/2}]_2 \cdot 0.5\ N(CH_2-CH_2-CH_2-SiO_{3/2})(_3/1.9\%\ Pd$.

Example 10

200 mg of the Pd catalyst produced in example 1 were placed with 10 g cinnamic acid in 100 ml ethanol in a low-pressure hydrogenation apparatus of glass with a gas agitator.

Cinnamic acid was hydrogenated at a temperature of 25° C. and an $H_2$ superpressure of 10 mbars to phenylpropionic acid. The catalytic activity was 635 ml $H_2$/min./g catalyst.

Example 11

200 mg of a Pd catalyst produced according to example 2 but with a particle size of 50-100 μm were placed with 10 g cinnamic acid in 100 ml ethanol in a low-pressure hydrogenation apparatus of glass with gas agitator. Cinnamic acid was hydrogenated at a temperature of 25° C. and an $H_2$ superpressure of 10 mbars to phenylpropionic acid. The catalytic activity relative to noble metal was 20.8 ml $H_2$/min.mg palladium.

Example 12

200 mg of a Pt catalyst produced according to example 4 but with a particle size of 50-100 μm were placed with 5.8 g crotonic acid in 120 ml ethanol in a low-pressure hydrogenation apparatus of glass with gas agitator. Crotonic acid was hydrogenated at a temperature of 25° C. and an $H_2$ superpressure of 10 mbars to butyric acid. The catalytic activity was 320 ml $H_2$/min./g catalyst.

Further modifications and variations of the foregoing will be apparent to those skilled in the art and are intended to be encompassed by the claims appended hereto.

German priority application P 41 10 706.3 is relied on and incorporated herein by reference.

We claim:

1. A metal-containing, shaped, polymeric, tertiary and/or secondary organosiloxane amine compound, comprising a reaction product of a compound containing at least one noble metal selected from the group consisting of palladium, platinum, ruthernium and rhodium, with a shaped, polymeric organosiloxane amine, wherein the shaped organosiloxane amine consists essentially of units of the formula:

and/or of units of the formula:

in which

X represents 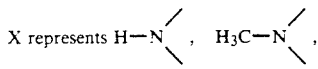

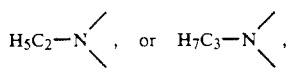

wherein R¹ to R⁵, which are identical or different, represent a group of the formula:

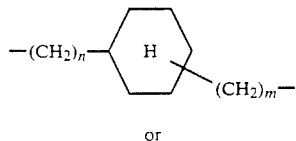 (III)

in which R⁶ is bound directly to the nitrogen atom and represents a linear or branched alkylene group with 1 to 10 carbon atoms, a cycloalkylene group with 5 to 8 carbon atoms or a unit of the general formula:

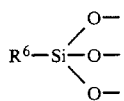

or

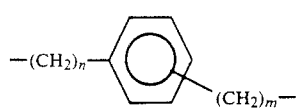

in which n and m each is an integer from 0 to 6, n is the number of methylene groups attached in the N position and m the number of methylene groups attached in the Si position, wherein free valences of the oxygen atoms bound to the Si atoms in components of formula III are saturated by silicon atoms of further groups of formula III and/or via metal atoms in one or more of cross-linking binding links selected from the group consisting of

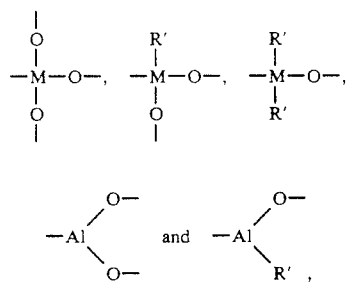 (IV)

wherein
M is Si, Ti or Zr, and
R' is linear or branched alkyl with 1 to 5 carbon atoms or a phenyl group,
wherein the ratio of the silicon atoms from the groups of formula III to the metal atoms in the cross-linking binding links (IV) is 1:0 to 1:30 and the ratio between the number of moles of amine units (I) and amine units (II) is 1:0 to 0:1, said polymeric organosiloxane amine compound being present as macroscopic spherical particles with a diameter of 0.01 to 3.0 mm, a specific surface of 0.01 to 1200 m²/g, a specific pore volume of 0.01 to 6.5 ml/g and a bulk density of 50 to 1000 g/l.

2. The metal-containing, shaped, polymeric organosiloxane amine compound according to claim 1, wherein palladium, platinum, ruthenium and/or rhodium are present primarily in elemental form.

3. The metal-containing, shaped polymeric organosiloxane amine compounds according to claim 1, wherein palladium, platinum, ruthenium and/or rhodium are present alone or in combination on the organosiloxane amine compound.

4. The metal-containing, shaped, polymeric organosiloxane amine compound according to claim 1, wherein the nobel metal content of the polymer system is 0.001% by weight to 20.0% by weight.

5. The metal-containing, shaped, polymeric organosiloxane amine compound according to claim 1, wherein metal content of the polymer system is 0.01% by weight to 10.0% by weight.

6. The metal-containing, shaped, polymeric organosiloxane amine compound according to claim 1, wherein R¹ to R⁵ stand for a group of the formula:

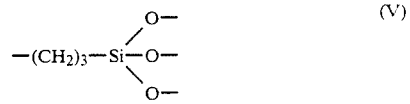 (V)

7. The metal-containing, shaped, polymeric organosiloxane amine compound according to claim 1, containing units of formulas I and II, wherein said compounds are present as statistical copolycondensates, block copolycondensates or mixed copolycondensates.

8. A method of producing a metal-containing, shaped, polymeric organosiloxane amine compound wherein the shaped organosiloxane amine consists essentially of units of the formula:

 (I)

and/or units of the formula:

 (II)

in which

X represents 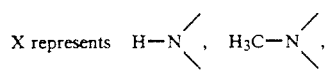

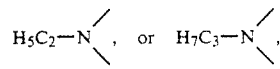

wherein R¹ to R⁵, which are identical or different, represent a group of the formula:

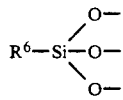
(III)

in which R⁶ is bound directly to the nitrogen atom and represents a linear or branched alkylene group with 1 to 10 carbon atoms, a cycloalkylene group with 5 to 8 carbon atoms or a unit of the general formula:

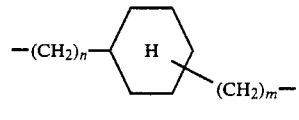

or

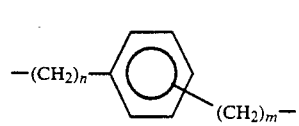

in which n and m each is an integer from 0 to 6, n is the number of methylene groups attached in the N position and m the number of methylene groups attached in the Si position, wherein free valences of the oxygen atoms bound to the Si atoms in components of formula III are saturated by silicon atoms of further groups of formula III and/or via metal atoms in one or more of cross-linking binding links selected from the group consisting of

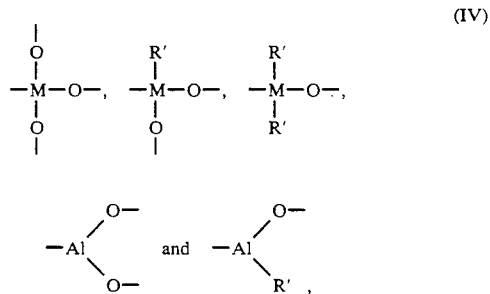
(IV)

wherein

M is Si, Ti or Zr, and

R' is linear or branched alkyl with 1 to 5 carbon atoms or a phenyl group, wherein the ratio of the silicon atoms from the groups of formula III to the metal atoms in the cross-linking binding links (IV) is 1:0 to 1:30 and the ratio between the number of moles of amine units (I) and amine units (II) is 1:0 to 0:1, said polymeric organosiloxane amine compound being present as macroscopic spherical particles with a diameter of 0.01 to 3.0 mm, a specific surface of 0.01 to 1200 m²/g, a specific pore volume of 0.01 to 6.5 ml/g and a bulk density of 50 to 1000 g/l, comprising reacting at least one hydrous or anhydrous metal compound (VI) of the formula:

M'₂PdX'₆, M'₂PdX'₄, PdX'₂, PdL₂X'₂, PdL₄X'₂, (VI)

M'₂PtX'₆, M'₂PtX'₄, PtX'₂, PtL₂X'₂, PtL₄X'₂,

RuX'₂L₄, RuI'₆X₂, M'₄RuX'₆, M'₄[Ru₂OX'₁₀], RuX'₃,

Ru(NO)X'₃, RuX'₃L₃, RuL₆X'₃, M'₂RhX'₅L, M'₃RhX'₆,

RhX'₃, RhL₅X'₃, RhL₆X'₃, RhL₃X'₃, RhL₄X'₃, or

M'RhX'₄L₂, in which

X' stands for Cl, Br, I, CN, NO₂, NO₃, ½ SO₄, acetate, acetyl acetonate, or OH,

L stands for NH₃, a primary, secondary or tertiary amine or diamine, CO or H₂O; and M' stands for H, Na, K, NH₄, or ½ Ba, in a stoichiometric proportion corresponding to a predetermined metal concentration in a solvent or solvent mixture which dissolves the metal compound (VI) at least partially, with a spherically formed, polymeric organosiloxane amine initial material consisting of units of formula I and/or II, to thereby produce a metal-containing polymeric solid, separating the solid and the liquid phase, subsequently treating the solid by washing or extracting said solid with solvent, drying the solid at room temperature to 250° C. in air, and recovering the solid product.

9. The process according to claim 8 wherein drying takes place under protective gas or in a vacuum.

10. The process according to claim 8 wherein after drying the solid is subjected to tempering in air or under protective gas at 150° to 300° C.

11. The process according to claim 8 wherein after drying the solid is classified according to size.

12. The process according to claim 8 wherein the solid is treated with a stoichiometric, less than stoichiometric or excess amount of a reducing agent for 1 minute to 48 hours at room temperature to 200° C. and optionally at a superpressure corresponding to the sum of the partial pressures of the components of the reaction mixture at the temperature selected for the reducing treatment.

13. The method according to claim 12, wherein the reaction of the metal compound (VI) with the shaped, polymeric organosiloxane and the reduction of the metal-containing solid is carried out in water and/or in a linear or branched alcohol with 1 to 5 carbon atoms.

14. The method according to claim 8, wherein the metal-containing, shaped, polymeric organosiloxane amine, which may be optionally treated with a reducing agent for 1 minutes to 48 hours at room temperature to 200° C., is washed after separation from the liquid phase with a lower, linear or branched alcohol with 1 to 5 carbon atoms.

15. The method according to claim 12, wherein the reduction of the metal-containing, shaped, polymeric organosiloxane amine is carried out with a linear or branched alcohol with 1 to 5 carbon atoms or with formaldehyde, an alkali formate or alkaline-earth formate, hydrazine, a hydrazine compound, an alkali- or alkaline-earth metal boron hydride, hydrogen or carbon monoxide with a borane compound, an alkali- or alkaline-earth metal alanate, alane or an alane compound or an alkali- or alkaline-earth metal hydride.

16. The method or producing the metal-containing, shaped, polymeric organosiloxane amine compound according to claim 8, wherein in the treating step, the metal-containing solid is treated immediately or after 24 hours by washing with an alcohol-containing solution to provide an alcohol-moist solid, and drying and/or tempering the alcohol-moist solid.

17. The method according to claim 16, wherein after drying, the solid product is reductively treated with hydrogen in a moist or a dry state at room temperature to 300° C. and at normal pressure or superpressure.

* * * * *